(12) United States Patent
Kim et al.

(10) Patent No.: US 8,145,381 B2
(45) Date of Patent: Mar. 27, 2012

(54) TRANSMITTING DATA OF A TELEMATICS TERMINAL

(75) Inventors: Wa-Sung Kim, Seoul (KR); Min-Seok Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 1003 days.

(21) Appl. No.: 11/425,810

(22) Filed: Jun. 22, 2006

(65) Prior Publication Data
US 2007/0011391 A1 Jan. 11, 2007

(30) Foreign Application Priority Data
Jun. 23, 2005 (KR) ................. 10-2005-0054675

(51) Int. Cl.
G06F 17/30 (2006.01)
(52) U.S. Cl. ........................................... 701/36; 700/94
(58) Field of Classification Search .................. 701/29, 701/33, 35, 36, 200, 208, 212; 340/995.1, 340/995.12, 995.16, 995.18; 375/E7.271, 375/E7.272; 707/104.1, E17.009; 700/94
See application file for complete search history.

(56) References Cited

U.S. PATENT DOCUMENTS

| | | | | | |
|---|---|---|---|---|---|
| 5,483,457 | A | * | 1/1996 | Shibata et al. | 701/221 |
| 5,935,214 | A | * | 8/1999 | Stiegler et al. | 709/238 |
| 6,009,363 | A | | 12/1999 | Beckert | 701/33 |
| 6,078,622 | A | * | 6/2000 | Boytim et al. | 375/257 |
| 6,173,232 | B1 | * | 1/2001 | Nanba et al. | 701/209 |
| 6,282,494 | B1 | * | 8/2001 | Hsu | 701/211 |
| 6,374,177 | B1 | * | 4/2002 | Lee et al. | 701/200 |
| 6,611,537 | B1 | * | 8/2003 | Edens et al. | 370/503 |
| 6,626,799 | B2 | * | 9/2003 | Watterson et al. | 482/4 |
| 6,918,858 | B2 | * | 7/2005 | Watterson et al. | 482/54 |
| 6,999,871 | B2 | * | 2/2006 | Ohno et al. | 701/200 |
| 7,058,462 | B1 | * | 6/2006 | Fujisawa et al. | 700/94 |
| 7,166,064 | B2 | * | 1/2007 | Watterson et al. | 482/54 |
| 7,645,212 | B2 | * | 1/2010 | Ashby et al. | 482/8 |
| 2002/0165067 | A1 | * | 11/2002 | Watterson et al. | 482/54 |
| 2004/0104842 | A1 | * | 6/2004 | Drury et al. | 342/357.13 |
| 2004/0133344 | A1 | * | 7/2004 | Hashida et al. | 701/208 |
| 2004/0205438 | A1 | * | 10/2004 | Chien et al. | 714/746 |

(Continued)

FOREIGN PATENT DOCUMENTS
CN 1540289 10/2004
(Continued)

OTHER PUBLICATIONS

CNET. Sanyo NV-E7000 Portable GPS and Mobile DVD Entertainment System. http://reviews.cnet.com/car-gps-navigation/sanyo-nv-e7000-portable/1707-3430_7-31394957.html. Downloaded Nov. 5, 2010.*

(Continued)

Primary Examiner — Mark Hellner
Assistant Examiner — Ari M Diacou
(74) Attorney, Agent, or Firm — Fish & Richardson P.C.

(57) ABSTRACT

Data of a telematics terminal is transmitted through an apparatus including a multimedia player, an audio interface, an embedded system, and a switch operatively connected between the audio interface and the embedded system. The multimedia player is configured to generate audio data, and the audio interface is configured to output audio data generated by the multimedia player. The switch is operatively connected between the audio interface and the embedded system, and is configured to selectively control the output of audio data or program data from the multimedia player.

26 Claims, 4 Drawing Sheets

U.S. PATENT DOCUMENTS

| | | | |
|---|---|---|---|
| 2005/0030311 A1* | 2/2005 | Hara et al. | 345/520 |
| 2005/0078620 A1* | 4/2005 | Balachandran et al. | 370/313 |
| 2005/0271068 A1* | 12/2005 | Hetzel et al. | 370/403 |

FOREIGN PATENT DOCUMENTS

| | | |
|---|---|---|
| EP | 0 383 094 | 8/1990 |
| JP | 07 177121 | 7/1995 |
| JP | 11 317009 | 11/1999 |
| WO | 2004/091207 | 10/2004 |

OTHER PUBLICATIONS

Sanyo. Installation and operation manual, Portable DVD navigation system. Part No. NV-E7000. Downloaded Nov. 5, 2010 from http://www.retrevo.com/support/Sanyo-NV-E7000-GPS-manual/id/468ci167/t/2/.*

ProForm 520 Treadmill PFTL5902 "Read Reviews". Eopinions.com. http://www.epinions.com/reviews/ProForm_520_Treadmill_PFTL5902. Downloaded on Apr. 8, 2011.*

Proform 520 User's Manual. Model No. PFTL59022. Icon Health and Fitness Inc. http://www.iconservice.com/CustomerService/manualsProductManuals.do?model=PFTL5902&modelName=PROFORM+520&version=2&company=11&language= Downloaded on Apr. 8, 2011.* iFIT treadmills feature review. TreadmillTips.com. http://www.treadmilltips.com/ifit.html. Downloaded: Apr. 8, 2011.*

Appendix A. Ari M. Diacou. Previously unpublished. Aug. 30, 2011.*

Loyd Case . Abit IC7-G Max II Motherboard Review. Extremetech.com. http://www.extremetech.com/computing/54440-abit-ic7g-max-ii-motherboard-review?print. Posted Jun. 17, 2003 at 4:00 pm. Downloaded Aug. 30, 2011.*

European Search Report dated Jan. 12, 2007, Reference No. NSL/060245/BLO; Application No. 06291018.7, (6 pages).

Office action in Chinese patent application No. 200610090424.7., 11 pages.

* cited by examiner

TRANSMITTING DATA OF A TELEMATICS TERMINAL

BACKGROUND

This description relates to data transmission through a telematics terminal.

A telematics terminal is generally mounted in a mobile vehicle, such as a motor vehicle, and is operatively connected with a wireless communication network. The telematics terminal may provide a call function, map information, a multimedia function, a GPS (Global Positioning System) navigation function, and an audio/video system.

SUMMARY

In one general aspect, data is transmitted by transmitting an audio signal and data through an audio interface of a multimedia player of a telematics terminal. The transmission of audio signals and data through the audio interface may reduce a fabrication cost of a telematics terminal.

In another general aspect, program data is transmitted quickly to an embedded system of a telematics terminal through an audio interface of a multimedia player of the telematics terminal.

In another general aspect, transmitting data includes generating audio data from a multimedia player. The audio data is output through an audio interface. Program data output from the multimedia player is output through the audio interface.

Implementations may include one or more of the following features. For example, audio data generated by a multimedia player may be output through an audio interface and split or compressed program data output from the multimedia player may be output through the audio interface.

The split or compressed program data may be decompressed and output to an embedded system of the telematics terminal.

The program data may include an operation program or digital map data of the telematics terminal.

In another general aspect, an apparatus for transmitting data includes an audio interface configured to output audio data received from a multimedia player, and a switch operatively connected with the audio interface and configured to output program data received from the multimedia player through the audio interface.

Implementations may include one or more of the following features. For example, the multimedia player may be configured to output split or compressed data and to transmit the split or compressed data through the audio interface.

The multimedia player may be configured to provide a play mode and the switch may be configured to output audio data from the multimedia player to a speaker through the audio interface when the multimedia player is in the play mode.

The multimedia player may be configured to provide a data play mode and the switch may be configured to output program data to an embedded system through the audio interface when the multimedia player is in the data play mode.

The apparatus may include a storage unit configured to store the program data received through the audio interface.

The apparatus may include the multimedia player, which may be a compact disk (CD) player or a digital video disk (DVD) player.

The program data may include program operating data or digital map data.

In another general aspect, an apparatus for transmitting data of a telematics terminal includes a multimedia player configured to generate audio data, an audio interface configured to output audio data generated by the multimedia player, an embedded system for a telematics terminal, and a switch operatively connected between the audio interface and the embedded system. The audio data may include program data, and the switch is configured to selectively control whether program data from the audio interface is provided to the embedded system.

Implementations may include one or more of the following features. For example, the apparatus may include a storage unit within the embedded system and configured to store the program data received through the audio interface.

The program data may include program operating data of the embedded system or digital map data.

The multimedia player may be configured to output split or compressed program operating data and to transmit the split and compressed data to the switch and through the audio interface.

The apparatus may include a decompression unit configured to decompress the split or compressed program data. The decompressed program data may be stored in the storage unit of the embedded system.

The multimedia player may be a compact disk (CD) player or a digital video disk (DVD) player.

The embedded system may be configured to correct a program data error and to store the corrected program data in the storage unit.

The audio interface may include an SPDIF (Sony/Philips Digital Interface) or I2S (Inter-IC-Sound interface).

Other features will be apparent from the following description, including the drawings, and the claims.

DETAILED DESCRIPTION

Figure 1:
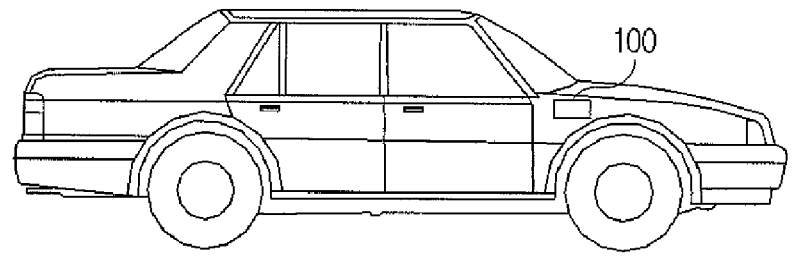
FIG. 1 shows a telematics terminal mounted in a motor vehicle.
Figure 2:
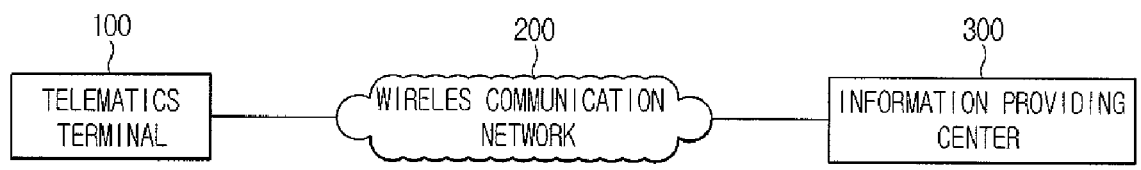
FIG. 2 is a block diagram of one type of telematics system.

Referring to FIGS. 1 and 2, a telematics terminal 100 is generally mounted in a car and may be operatively connected with an information providing center 300 for providing telematics service information, such as a call function, map information, traffic information, and/or multimedia information. The telematics terminal 100 is configured to receive the telematics service information through a wireless communication network 200 and to provide the received telematics service information to users.

One type of apparatus for transmitting data of the telematics terminal transmits data output from a CD (Compact Disk)/DVD (Digital Video Disk) player (not shown) in the telematics terminal 100 to an embedded system (not shown) of the telematics terminal 100 through an ATAPI (Advanced Technology Attachment Packet Interface). For example, referring to FIGS. 3 to 5, data may be transmitted quickly by transmitting an audio signal and data through an audio interface of a multimedia player, such as a CD/DVD player of a telematics terminal in a car.

Figure 3:
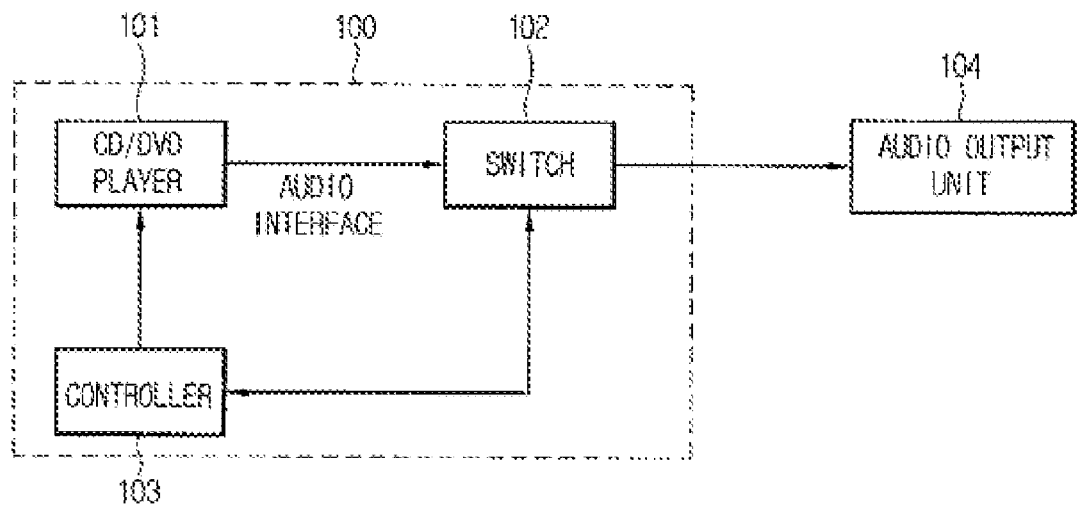
FIG. 3 is a block diagram of a data transmission apparatus of a telematics terminal.

Referring to FIG. 3, the data transmission apparatus of the telematics terminal 100 includes an audio interface (e.g., an audio line) for outputting audio data generated by a CD/DVD player 101 (i.e., a multimedia player). The data transmission apparatus includes a switch 102 operatively connected with the audio interface and outputting the program data and the audio data output from the CD/DVD player 101 through the audio interface. The switch 102 outputs the program data to a controller 103 (i.e., an embedded system) of the telematics terminal 100. The controller 103 stores the program data in an internal storage unit (not shown). The audio interface may include an SPDIF (Sony/Philips Digital Interface), I2S (Inter-IC-Sound interface), or similar audio interface.

Referring to FIG. 3, an exemplary operation of the data transmission apparatus includes first changing an operation mode of the CD/DVD player 101 to a play mode. The controller 103 generates a first control signal and outputs the first control signal to the switch 102. If the operation mode of the CD/DVD player 101 is changed to the play mode by a user, the controller 103 outputs audio and video data stored in a CD or a DVD inserted in the CD/DVD player 101 to an audio output unit 104 and a display unit (not shown), respectively, through the audio interface and a video interface. The CD/DVD player 101 outputs the audio and video data stored in the CD or in the DVD through the audio interface and the video interface under the control of the controller 103, and the CD/DVD player 101 and the controller 103 can be connected through an SPI (Serial Peripheral Interface).

The switch 102 selects the audio data output through the audio interface of the CD/DVD player 10 based on the first control signal, and outputs the selected audio data to the audio output unit 104 (e.g., a speaker). The audio data is digital audio data and may be converted to an analog signal using a DAC (Digital to Analog Converter). For example, the DAC can convert the digital audio data into an analog audio signal and output the converted analog audio signal to the speaker.

If the operation mode of the CD/DVD player 101 is changed to a data play mode by the user, the controller 103 generates a second control signal that the controller 103 outputs to the switch 102. If the operation mode of the CD/DVD player 101 is changed to the data play mode by the user, the controller 103 outputs program data (e.g., operation program data or digital map data) stored in the CD or in the DVD inserted in the CD/DVD player 101 through the audio interface.

The switch 102 selects the program data output through the audio interface of the CD/DVD player 101 based on the second control signal, and outputs the selected program data to the controller 103. The controller 103 stores the program data output from the audio interface in a storage unit, such as a flash memory (not shown). For example, the controller 103 may be an embedded system which controls an overall operation of the telematics terminal. If the program data is new operation program data, the controller 103 upgrades the previous operation program data with the new operation program data. For example, the controller may replace old digital map data with new digital map data provided in the program data. The program data also may includes other types of data or software changes used to upgrade system operation.

Accordingly, the audio interface of the CD/DVD player of the telematics terminal can be used as a data transmission interface instead of an ATAPI (Advanced Technology Attachment Packet Interface) or other interface of generally higher fabrication cost.

Figure 4:
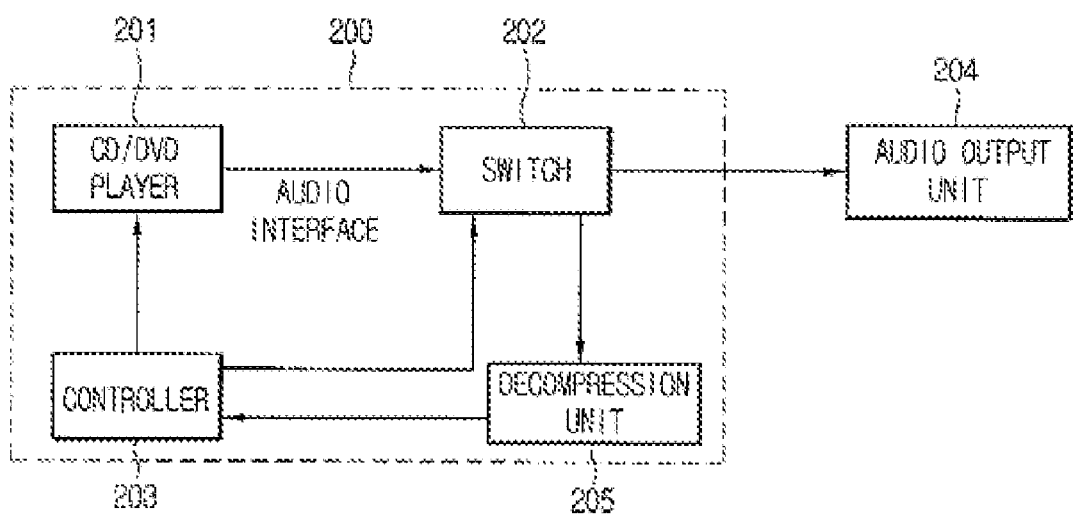
FIG. 4 is a block diagram of a data transmission apparatus of a telematics terminal.

Referring to FIG. 4, an exemplary process supports rapid data transmission of program data through the audio interface. The data transmission apparatus of the telematics terminal 200 includes an audio interface that may be in the form of an audio line for outputting audio data generated by a CD/DVD player 201 and a switch 202 operatively connected with the audio interface and outputting split and/or compressed program data output from the CD/DVD player 202 through the audio interface. The data transmission apparatus includes a decompression unit 205 for decompressing the split and/or compressed program data and for outputting the decompressed program data. The decompression unit 205 outputs the decompressed program data to a controller, such as an embedded system 203 of the telematics terminal 200, and the controller 203 stores the program data in a storage unit (not shown).

Figure 5:
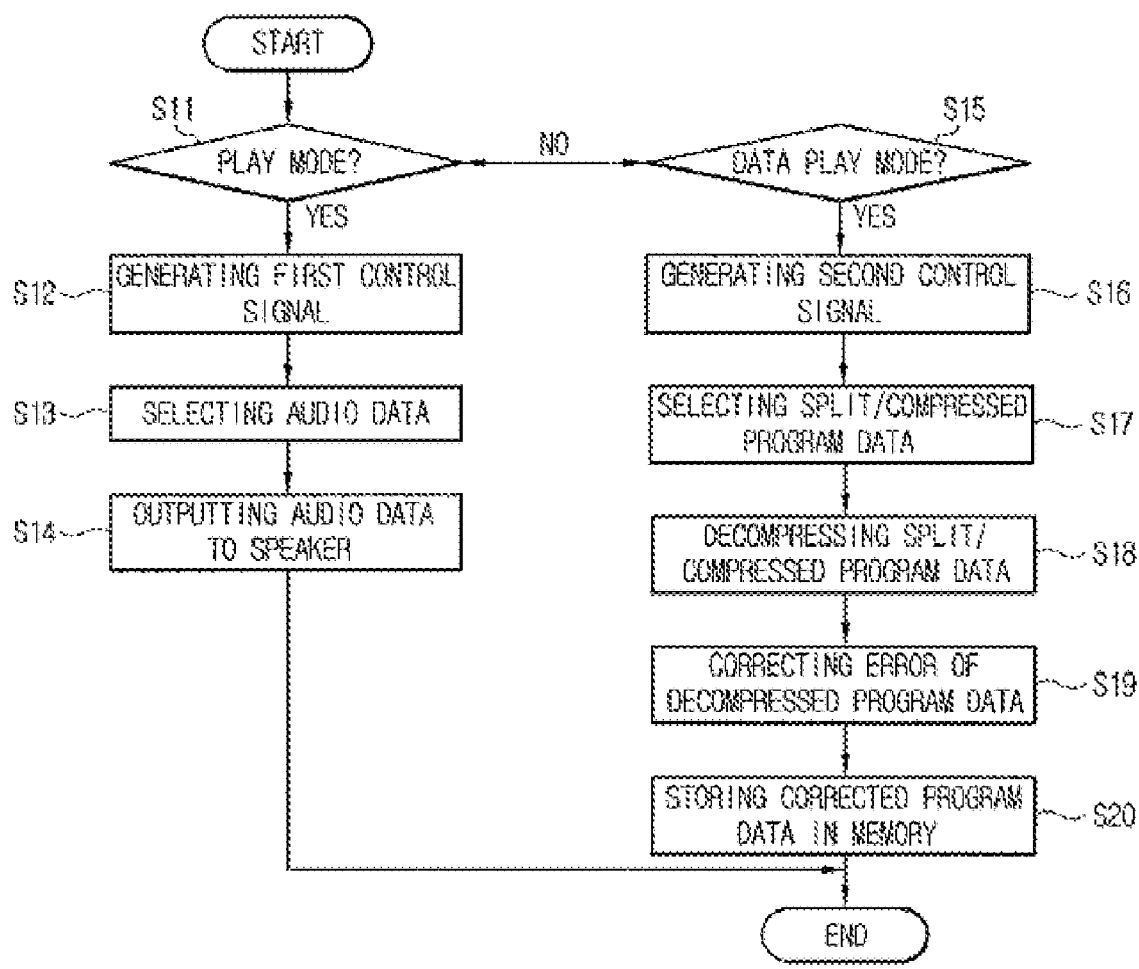
FIG. 5 is a flow chart of an exemplary process for transmitting data of the telematics terminal.

Referring to FIGS. 4 and 5, in an exemplary process for transmitting data, an operation mode of the CD/DVD player 201 is changed to a play mode by a user (S11). The controller 203 then generates a first control signal and outputs it to the switch 202 (S12). If the operation mode of the CD/DVD player 201 is changed to the play mode, the controller 203 outputs digital audio/video data stored in a CD or in a DVD inserted in the CD/DVD player 201 through the audio interface or a video interface.

Next, the switch 202 selects the audio data output through the audio interface of the CD/DVD player 201 based on the first control signal (S13). The the selected audio data is output to the speaker 204 (S14).

If the operation mode of the CD/DVD player 201 is changed to a data play mode by the user (S15), the controller 203 generates a second control signal and outputs it to the switch 202 (S16). If the operation mode of the CD/DVD player 201 is changed to the data play mode by the user, the controller 203 outputs split and/or compressed program data, e.g., operation program data or digital map data, stored in the CD or in the DVD inserted in the CD/DVD player 201 through the audio interface. The CD/DVD player 201 reads the split and/or compressed program data stored in a CD-ROM (or DVD-ROM) under the control of the controller 203, and outputs the read data to the switch 202 through the audio interface. The program data stored in the CD or in the DVD may include program data which has been split into multiple files and/or compressed.

The switch 202 selects the split and/or compressed program data output through the audio interface of the CD/DVD player 201 based on the second control signal (S17). The selected split and/or compressed program data is sequentially output to the decompression unit 205. The decompression unit 205 sequentially receives the split and/or compressed program data, and sequentially decompresses and outputs the program data to the controller 203 (S18). For example, while additional split and/or compressed program data, e.g., binary data, is being received, the decompression unit 205 decompresses previously received first split and/or compressed program data.

The controller 203 receives the decompressed program data and sequentially stores the decompressed program data in a memory (not shown) device. The controller 203 can correct an error of the decompressed program data (S19). The corrected program data is then stored in the memory (S20). For example, while the decompression unit 205 is receiving the second split and/or compressed program data, the controller 203 can correct an error of the first decompressed program data and store the corrected first program data in the memory.

Accordingly, the operation program or digital map data can be quickly transmitted to the controller through the audio interface of the CD/DVD player 201 of the telematics terminal 200. For example, the operation program data can be split and/or compressed, and the split and/or compressed program data is transmitted through the audio interface of the CD/DVD player 201. The transmitted program data is decompressed so that the operation program or the digital map data can be quickly transmitted to the controller.

Figure 6:
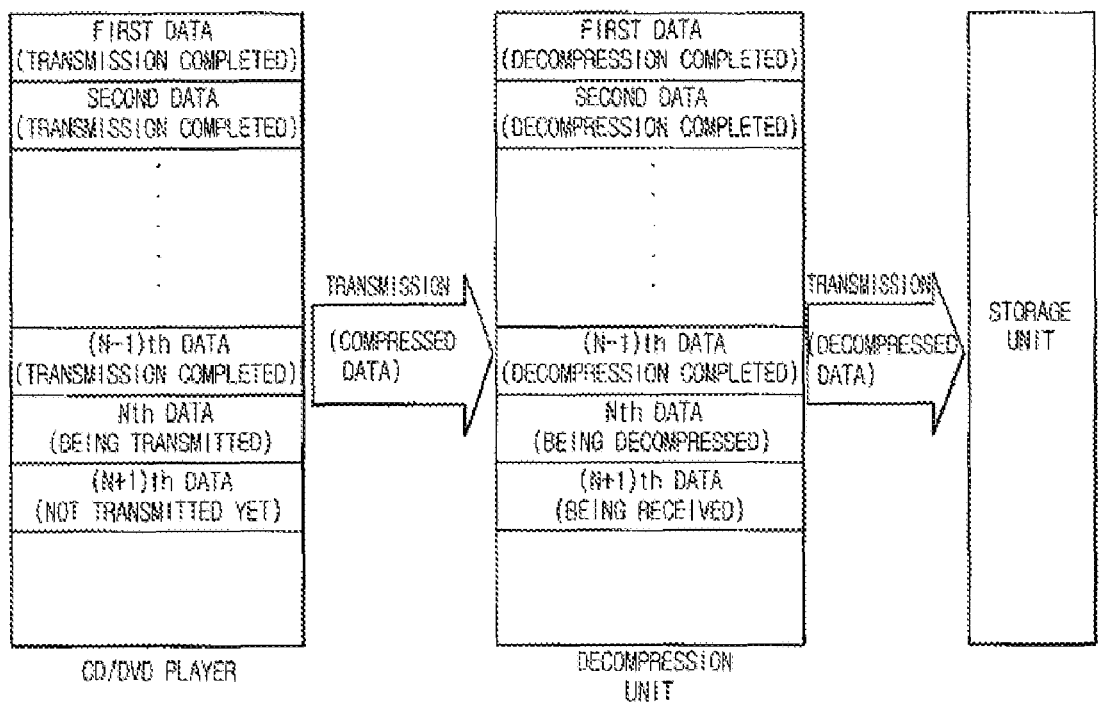
FIG. 6 is a functional block diagram of an exemplary process for decompressing and storing split and compressed program data.

Referring to FIG. 6, an exemplary process includes having the decompression unit 205 receive a (N−1)th unit of compressed program data transmitted from the CD/DVD player 201. The decompression unit 205 decompresses the (N−1)th unit of compressed program data and stores the data in the flash memory. While the decompression unit 205 decompresses the (N−1)th unit of compressed program data, the decompression unit receives the Nth unit of program data. The decompression unit 205 then receives the (N+1)th unit of compressed program data while simultaneously decompressing the Nth unit of compressed program data from the CD/DVD player. The process can be applied to various devices for playing multimedia (e.g., the CD/DVD player), as well as to the telematics terminal.

Since the audio interface of the CD/DVD player of the telematics terminal is used as a data transmission interface (e.g., instead of the ATAPI), the overall cost of the telematics terminal may be reduced. The operation program or digital map data can be quickly transmitted to the embedded system through the audio interface of the CD/DVD player of the telematics terminal. For example, the operation program data can be split and compressed, and the compressed program data may be sequentially transmitted through the audio interface of the CD/DVD player. The transmitted compressed program data is decompressed, so that the operation program can be quickly transmitted to the embedded system.

By storing the split program data in the memory of the controller of the telematics terminal, a controller having even a small memory capacity can efficiently check for error(s) of the split program data and store the errors and/or data in the memory.

Various modifications, additions and substitutions are possible. Accordingly, other implementations are within the scope of the following claims.

What is claimed is:

1. A telematics terminal system for transmitting data comprising:
a multimedia player configured to:
output program data and audio data, the program data comprising one or more of program upgrade data, digital map data, and operation program data,
transmit the program data and the audio data through an audio interface, wherein the program data comprises split program data or compressed program data, and
execute in at least two modes of operation, wherein at least one mode of operation is a play mode and one mode of operation is a data play mode, wherein the play mode operates at a time that is different from a time of operation of the data play mode;
the audio interface configured to output the audio data received from the multimedia player and configured to output the program data received from the multimedia player to an embedded system of the telematics terminal, the embedded system being operable to store the program data on a storage device of the telematics terminal;
a controller connected with the multimedia player and configured to generate a first and second control signal, the first control signal generated in response to the multimedia player operating in the play mode and the second control signal generated in response to the multimedia player operating in the data play mode; and
a switch operatively connected with the audio interface and the controller, the switch configured to:
select one of the control signals from the controller,
receive the selected control signal,
responsive to receiving the first control signal as the selected control signal, control the audio interface to output the audio data from the audio interface, and
responsive to receiving the second control signal as the selected control signal, control the audio interface to output the program data from the audio interface.

2. The system according to claim 1, wherein the multimedia player is configured to provide a play mode and the switch is configured to output the audio data from the audio interface to a speaker when the multimedia player is in the play mode.

3. The system according to claim 1, wherein the multimedia player is configured to provide a data play mode and the switch is configured to output the program data to the embedded system through the audio interface when the multimedia player is in the data play mode.

4. The system according to claim 3, further comprising a storage unit configured to store the program data received through the audio interface.

5. The system according to claim 1, wherein the multimedia player is a compact disc (CD) player or a digital video disc (DVD) player.

6. The telematics terminal of claim 1, wherein the multimedia player is configured to allow a user to select the mode of operation.

7. The system of claim 1, wherein the telematics terminal system is a vehicle-mounted telematics terminal system.

8. The system of claim 7, wherein the at least one mode of operation for the play mode is associated with the output of the audio data and the other mode of operation for the data play mode is associated with the output of the program data.

9. The system of claim 1, wherein the telematics terminal system is configured to be physically installed in a vehicle.

10. A system for transmitting data of a telematics terminal comprising:
a multimedia player configured to:
generate audio data and program data, wherein the program data comprises split program data or compressed program data, the program data comprising one or more of program upgrade data, digital map data, and operation program data, and
operate in at least two modes of operation, wherein at least one mode of operation is a play mode and one mode of operation is a data play mode, wherein the play mode operates at a time that is different from a time of operation of the data play mode;
an audio interface configured to output audio data and program data generated by the multimedia player;
an embedded system for a telematics terminal;
a controller operatively connected to the multimedia player and configured to generate a first and second control signal, the first control signal generated in response to the multimedia player operating in play mode and the second control signal generated in response to the multimedia player operating in data play mode; and
a switch operatively connected between the audio interface and the embedded system, the switch configured to:
select one of the control signals from the controller,
receive the selected control signal,
responsive to receiving the first control signal as the selected control signal, control the audio interface to output the audio data from the audio interface, and
responsive to receiving the second control signal as the selected control signal, control the audio interface to output the program data from the audio interface.

11. The system according to claim 10, further comprising a storage unit within the embedded system, wherein the storage unit is configured to store the program data received through the audio interface.

12. The system according to claim 10, wherein the program data comprises program operating data of the embedded system.

13. The system according to claim 10, wherein the program data comprises digital map data.

14. The system according to claim 10, further comprising a decompression unit configured to decompress the split or compressed program data.

15. The system according to claim 14, wherein the decompressed program data is stored in a storage unit of the embedded system.

16. The system according to claim 10, wherein the multimedia player is a compact disc (CD) and digital video disc (DVD) player.

17. The system according to claim 10, wherein the embedded system is configured to correct a program data error and to store the corrected program data in a storage unit.

18. The system according to claim 10, wherein the audio interface is a SPDIF (Sony/Philips Digital Interface) or an I2S (Inter-IC-Sound interface).

19. A method for transmitting data comprising:
receiving information into a multimedia player of a telematics terminal that indicates a user selection of one of a first mode that relates to audio data and a second mode that relates to digital map data;
responsive to receiving the information for the user selection of the first mode,
accessing the audio data from the multimedia player;
generating a first control signal in a controller electrically connected to the multimedia player;
sending the first control signal from the controller to a switch;
responsive to the switch receiving the first control signal, outputting the audio data through an audio interface, wherein the switch is coupled to the audio interface;
responsive to receiving the information for the user selection of the second mode,
accessing program data from the multimedia player, wherein the program data comprises the digital map data of the telematics terminal;
generating, in the second mode, a second control signal in the controller;
sending the first control signal from the controller to the switch;
responsive to the switch receiving the second control signal, outputting the program data through the audio interface to an embedded system of the telematics terminal.

20. The method according to claim 19, wherein the program data comprises compressed units of program data, and the method further comprises:
decompressing the compressed units of program data; and
storing the program data.

21. The method of claim 19, further comprising configuring the program data to comprise split program data.

22. The method of claim 19, further comprising configuring the program data to comprise compressed program data.

23. The method of claim 19, further comprising configuring the program data to comprise program operating data.

24. A method for transmitting data comprising:
receiving information into a multimedia player of a telematics terminal that indicates a user selection of one of a first mode that relates to audio data and a second mode that relates to an operation program;
responsive to receiving the information for the user selection of the first mode,
accessing the audio data from the multimedia player;
generating a first control signal in a controller electrically connected to the multimedia player;
sending the first control signal from the controller to a switch;
responsive to the switch receiving the first control signal, outputting the audio data through an audio interface, wherein the switch is coupled to the audio interface;
responsive to receiving the information for the user selection of the second mode,
accessing program data from the multimedia player, wherein the program data comprises the operation program of the telematics terminal;
generating, in the second mode, a second control signal in the controller;
sending the first control signal from the controller to the switch;
responsive to the switch receiving the second control signal, outputting the program data through the audio interface to an embedded system of the telematics terminal.

25. The method of claim 24, further comprising configuring the program data to include new program data configured for upgrading software in the telematics terminal.

26. The method of claim 25, further comprising configuring the new program data to replace the operation program data at the telematics terminal.

* * * * *